United States Patent
Okamoto et al.

[15] 3,706,971
[45] Dec. 19, 1972

[54] BRAKE CONTROL ARRANGEMENT

[72] Inventors: Tosiaki Okamoto, Kariya; Koziro Mori, Okazaki; Hayao Yamazaki, Osaka; Takao Abu, Osaka; Takefumi Sato, Osaka, all of Japan

[73] Assignees: Aisin Seiki Company Limited, Kariya-shi; Sharp Corporation, Osaka, Japan

[22] Filed: April 2, 1970

[21] Appl. No.: 25,065

[30] Foreign Application Priority Data

April 5, 1969 Japan............................44/26297
April 18, 1969 Japan............................44/30643

[52] U.S. Cl. .............................340/52 B, 303/21 AF
[51] Int. Cl. ............................................B60t 17/22
[58] Field of Search............340/52 C, 52 B, 53, 52 R; 303/24 R, 21, 21 AF, 21 EB

[56] References Cited

UNITED STATES PATENTS 3,516,715 6/1970 Fielek, Jr. et al........................303/21
3,275,384 9/1966 Hirzel..............................303/21 EB

*Primary Examiner*—John W. Caldwell
*Assistant Examiner*—Glen R. Swann, III
*Attorney*—Sughrue, Rothwell, Mion, Zinn & Macpeak

[57] ABSTRACT

An antiskid hydraulic brake pressure control system comprising a brake pressure reducing controller including a skid sensor; and a safety circuit said system being characterized by the provision of an pseudo-skid signal generator, said pseudo-signal being similar to a regular one generated in and delivered from said skid sensor, said skid pseudo-signal being fed to said sensor.

8 Claims, 7 Drawing Figures

BRAKE CONTROL ARRANGEMENT

This invention relates to improvements in and relating to automotive antiskid brake system. It concerns more specifically a novel safety system adapted for use with a hydraulic brake system.

The provision of antiskid brake control system serves, as conventionally known, to improve the safety during application of a braking effort to the automotive wheel means. If, however, there are defects in the antiskid brake control system, resulting in a worse operating condition of such antiskid system, the provision may not provide the expected results.

For this purpose, it is necessary to provide a safety circuit adapted for detecting a defective condition of the antiskid brake system. According to the prior art, such a safety circuit has been so designed and arranged that if the hydraulic pressure reducing period for reduction of the hydraulic brake pressure during a brake application extends for an exceptionally longer time, a certain mechanism is brought into operation for transferring the skid-prevention device into its non-operating position. No warning is given with such conventional mechanism, in advance of the actuation thereof, for ascertaining if the mechanism can be operate or not.

It is therefore the main object of the invention to provide a safety means adapted for cooperating with a conventional antiskid hydraulic brake control system for issuing, in advance of the operation of the brake pressure control mechanism a cautionary notice of a disabled condition thereof.

A further object is to provide a safety means of the above kind which is capable of improving the operation of the antiskid brake control system.

These and further objects and features of the invention will become more apparent as the description proceeds.

As will be more fully described hereinafter, the invention provides such a desirable and favorable chance that in advance of an application of braking effort to automotive vehicle wheels, especially in advance of start of the vehicle, it can be ascertained if the antiskid brake control mechanism can operate properly or not. This ascertaining or sensing can be initiated in relation with an "on" or "off" operation of any selected one of switches, relays or the like electrical control or actuating appliances fitted in the vehicle. The manual or powered door-opening operation can be utilized for the same purpose. Starting or stopping operation of the conventional self-starting electric motor can equally be utilized. As an alternative measure, an ignition of a parking lamp or an interruption of lighting thereof can also be utilized. The conventional oil warning lamp can also be utilized.

In any one of these situations, a similar electrical advance or pilot signal, which will be referred to as "pseudo-skid signal" hereinafter, to measure the skid-warning electrical signal is applied to the output side of an electrical skid sensing means, such as an electric generator or the like as a skid sensor commonly used in the conventional antiskid brake control mechanism. By the application of the pseudo-skid signal, it is determined if a conventional pressure reducing mechanism adapted for bringing, when caused to operate, a brake pressure reduction into effect, is operable properly or defectively.

For this purpose, a pressure reducing period settable by application of said pseudo-skid signal is compared with the operation period of the conventional pressure reducing mechanism necessary for the required hydraulic brake pressure reduction. In this case, however, a release of the brake pressure is not brought about since there is no brake application.

Relying upon the thus sensed longer or shorter compared differential and judging therefrom, defective operational condition of the antiskid device is detected.

Frequently encountered conventional defects in the anti-skid brake control mechanism are short-circuiting and/or breakage of coil means or conductor means of the sensing generator or the like means adapted for sensing skidding or skidded condition of the vehicle wheel; those of circuit elements and unfavorable aging thereof; and/or mechanical and electrical defects in the pressure reducing mechanism. It is frequently encountered from any one of these defects or any combination thereof that even if the wheel is skidding or has skidded, the pressure reducing mechanism can not be brought into operation, and vice versa.

When it is found that the pressure reducing mechanism operates for a longer period than the preset value in the above sense, its meaning is such that the practical pressure reducing period is longer than necessary, resulting in an ineffective brake application and requiring in effect a longer braking period till the vehicle stops. In such case, a rear-end collision may be feared.

On the other hand, when the pressure reducer should operate for a shorter period than the preset value, it means that the reducer will act a shorter period than necessary, leading to a locked condition of the wheel.

If a driver is not aware of an operational defect of the antiskid brake controller, he does not imagine of a possible wheel lock caused by an excessive brake application, because he may have an overreliance on the provision of the antiskid brake control. This will invite a lowered safety of brake applying operation.

In the practice of the invention, it is preferable to provide a vacuum-operated switch or a displacement switch to the brake pressure-reducer, in place of sensing means of the impressed voltage upon an electromagnetic valve fitted in the pressure reducer, for detecting the pressure reducing period. By employing the above means, the measurement of the period of pressure reducing operation is, relied in a more accurate and easy way on the duration period of the switch, when closed.

By relying upon the novel principle of the present invention, the driver is warned of an occasional fault in the pressure reducing controller and the controller is intentionally disabled for avoiding fear of a rear-end collision of the vehicle.

Since the antiskid brake control mechanism is only rarely brought into operation, certain components thereof may become inoperative by rusting, greasening or the like causes. With use of the safety device as proposed by the invention, cautionary and false-preventive running of the brake pressure reducer can easily effected by application of a pseudo-skid signal for avoiding possible false operation of said reducer.

In the following, several preferred embodiments of the invention will now be described in detail by reference to the accompanying drawings which illustrate the embodiments only for the purpose of illustration and thus only by way of example.

Figure 1:
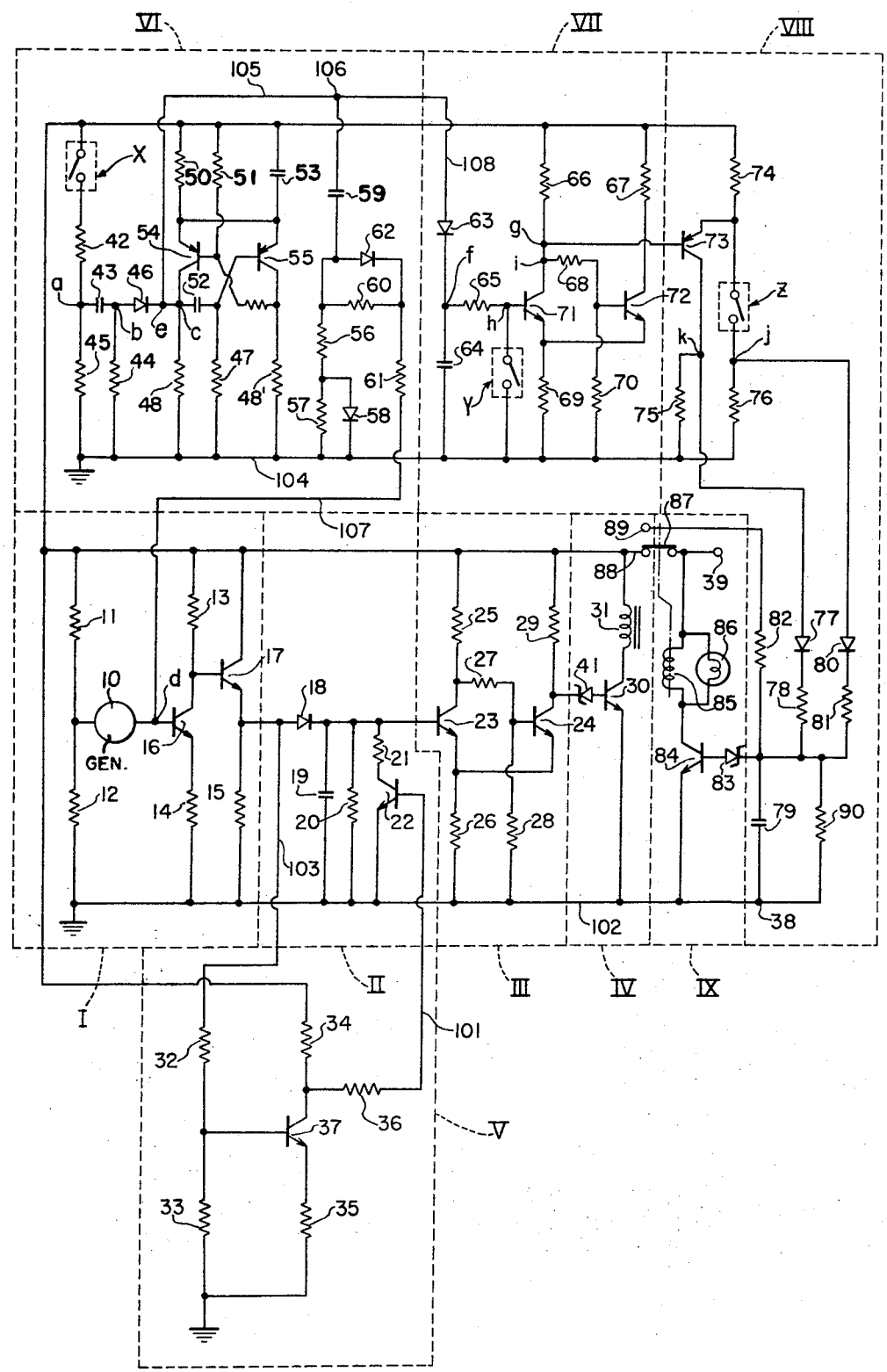
FIG. 1 is a circuit diagram of a preferred embodiment of an electronic safety circuit as the main component of the hydraulic brake control system according to the invention.

In the embodiment shown in FIG. 1, the electronic circuit shown comprises nine sections I, II, III, IV, V, VI, VII, VIII and IX, of which those denoted I–V constitute main sub-circuits, while those denoted VI–IX constitute safety sub-circuits.

In the first sub-circuit I, there is a signal generator 10, shown being in a highly simplified way only by a circle, which is preferably an a.c. generator which is mechanically connected or coupled through a flexible shaft or the like, not shown, with a selected one of the wheels of an automotive vehicle, not shown, in which a conventional hydraulic brake system is fitted, said signal generator 10 being so arranged as to deliver an electric signal upon sensing the deceleration of the related wheel when the latter is subjected to an appreciable braking or the acceleration of the same wheel when its applied braking effort is released, as will more fully understood as the description proceeds. Resistors 11, 12, 13, 14 and 15 and transistors 16 and 17 are electrically connected mutually as shown in FIG. 1, so as to constitute in combination an amplifier for amplifying the signal output from the generator 10 conveyed therefrom through a junction d to the base electrode of the transistor 16. The thus amplified signal is conveyed to sub-circuits II and V, as will become more clear in the following description.

The signal generator 10 is so designed and arranged that it delivers a negative signal upon sensing an acceleration of the wheel and a positive signal upon sensing a deceleration.

The sub-circuit II includes diode 18, condenser 19, resistors 20 and 21 and transistor 22 which constitute in combination a kind of charging and discharging circuit, of which the series combination of diode 18 and condenser 19 is connected across the resistor 15 contained in the foregoing sub-circuit I and the resistor 20 is connected in parallel with the condenser 19. The series combination of resistor 21 and transistor 22 is connected again in parallel with the same condenser 19. As may easily be seen, the condenser 19 becomes charged when a positive signal potential prevails in the sub-circuit I by following up thereafter which charge will be discharged through the transistor 20. The charge will be also discharged through the series combination of resistor 21 and transistor 22 when the latter is in its conductive state.

The terminal voltage of condenser 19 is conveyed to the base electrode of transistor 23 contained in the next succeeding sub-circuit III which includes further a transistor 24 and resistors 25, 26, 27, 28 and 29, which are connected as shown and constitute, in combination with the transistor 23, a conventional Schmitt circuit which is designed and arranged in such a way that when a positive signal beyond a predetermined value, which is determined by the circuit components' constants of the section III, is fed from the condenser 19 contained in the foregoing section II, a constant output continues to be delivered at the collector side of transistor 24, so far as the said input signal is maintained. The collector output will be fed through Zener diode 41 to the base electrode of a transistor 30. Diode 41, transistor 30 and an electromagnetic coil 31 connected with the collector side thereof are contained in the section IV and connected mutually as shown, so as to provide a brake pressure release circuit, as will become more clear as the description proceeds. This circuit is so designed and arranged that so long as the output signal is maintained to from the foregoing section III to the present section IV, the transistor 30 remains conductive and the electromagnet coil 31 is energized.

With this actuator coil 31 energized in the above-mentioned way, a conventional servo means is brought into actuation and a certain, yet conventional to the antiskid brake designers, pressure reducing mechanism is thereby actuated for reducing the applied hydraulic brake pressure.

The section V adapted for receiving the output signal from the said first section I through conductor means 100, includes resistors 32, 33, 34, 35 and 36 and a transistor 37 which are mutually connected as shown, so as to provide an actuating period modifying circuit wherein the collector potential of the transistor 37 is raised upon being fed with a negative signal delivered from the section I, The collector electrode of the transistor 37 is connected through a resistor 36 and a conductor 101 to the base electrode of transistor 22 contained in the second section. With a low collector potential at transistor 37 such as when a positive input signal is fed to the section V from the section I, the transistor 22 of the section II is turned off, and vice versa.

With conduction of transistor 22, the discharge time constant of the condenser 19 of the section II will become smaller, thereby the initiation of voltage drop at the terminal of the condenser being advanced in comparison with the case where the transistor is being in its non-conducting state.

The aforementioned several sections I–V are connected with a d.c. source, not shown, through a pair of terminals 38 and 39 of which terminal 38 is grounded through a common negative conductor 102 as shown.

The overall operation of the sections I–V is as follows.

When a driver of the vehicle actuate a conventional brake pedal for performing a brake application, the rotational speed of the wheel will be reduced and a deceleration signal is generated in the generator 10 of section I and the signal is then conveyed to transistors 16 and 17 in succession, thereby being amplified. The amplified positive signal is conveyed from the section I directly to the section II, on the one hand, and through a conductor 103 to the section V. The conveyed output signal is the larger with larger positive signals fed from the section I or larger degrees of deceleration at the related vehicle wheel.

With the positive signal fed from the section I, the condenser 19 in the section II will become charged through diode 18 to an electrical potential which is responsive to the value of said signal. Since the potential at the condenser 19 is conveyed to the section III, when it exceeds a certain predetermined value, determined by the overall circuit constant of the section, the Schmitt circuit will be brought into actuation and thus a brake release signal is given to the released circuit of the section IV, the signal being then conveyed through Zener diode 41 to the transistor 30 which turns on. With actuation of this transistor, a substantial current will flow through the coil 31 and the brake pressure release mechanism or more specifically the hydraulic pressure reducing means is thereby actuated for releasing the hitherto applied brake cylinder pressure.

The condenser 19, upon charged to an electrical potential responsive to the value of the positive signal fed from the first section I, will discharge through the resistor 20.

Since the collector potential of transistor 37 of the section V remains at a substantially lower value during the continuation of delivery of positive signal from the first section I, the transistor 22 of the section II remains off and the discharge of condenser 19 is performed exclusively through resistor 20.

With reduction of the potential at the condenser 19 through its discharge below the predetermined value, the actuation of the Schmitt circuit contained in the section III will be brought into interruption, thus the transistor 30 of the next succeeding stage or section IV becomes de-energized, resulting in the de-energization of actuator coil 31. Therefore, the brake is re-applied to the wheel automatically and the revolutional speed thereof will be reduced.

With brake release caused by the actuation of the section IV, the wheel will be brought again into rotation on account of the running inertia of the vehicle per se, and a reversed sense or negative signal will appear responsive to the acceleration of the wheel and in signal generator 10, a corresponding negative output signal is delivered from the first section I and conveyed therefrom to the fifth section V. An application of the same negative output signal to the second section II is positively prevented by the very provision of said diode 19.

With the negative input signal to the fifth section V, the collector potential at transistor 37 will rise gradually until the transistor 22 of the section II will turn on. With conduction of this transistor 22, the condenser 19 will discharge, not only through the way of resistor 20, but also through resistor 21 and transistor 22, therefore the discharging period being substantially shortened than otherwise.

The degree of conduction of the transistor 22 depends upon the value of transistor 37 of the section V, or more specifically upon the value of wheel acceleration signal delivered from the section I. The larger the acceleration signal, the shorter will be the discharging period of condenser 19 which results in a sooner interruption of working of the third section III, thus inviting a corresponding shortening of the brake releasing period.

Next, the construction and the function of the safety subcircuits or sectinons VI–IX will be described more in detail.

The sixth section VI constitutes a pseudo-skid signal generator adapted for generating a similar degree of signal to the deceleration or acceleration signal voltage developed in the signal generator 10 in the case of disadvantageous skidding. The voltage developed in the section VI is conveyed to the junction d.

In the section VI, there is a switch X, one end of which is connected through a resistor 42 and a junction a to a condenser 43 which is adapted for the formation of a trigger pulse, said junction being grounded through a resistor 45. The opposite terminal or junction b of condenser 43 is connected through diode 46, junctions e and c to a condenser 52. A resistor 44 is connected between junction b and conductor 104, and in the similar way, a further resistor 48 is connected between junction c and the same conductor. A self-biasing mono-stable multivibrator is provided in combination by transistors 54 and 55, resistors 47, 48, 50 and 48', and condensers 52 and 53 mutually connected as shown. The junction c is connected with the collector electrode of the transistor 54.

From the junction e, a lead 105 extends to a junction 106 which is connected electrically with one side of condenser 59, while the opposite side of the latter is connected with a diode 62 and a resistor 56 which is connected through a further resistor 57 to the conductor 104. A diode 58 is connected across the resistor 57 and a resistor 60 is connected across the diode 62. The parallel combination of diode 62 and resistor 60 is connected through a resistor 61 and a conductor 107 with the junction d. The resistors 56 and 57, diode 58 and condenser 59 constitute in combination a differentiating circuit.

The voltage differentiated in the last-mentioned circuit is conveyed through resistors 60 and 61 and diode 62 to the junction d of the signal generator 10.

On the other hand, the collector terminal c of the transistor 54 of the aforementioned monostable multivibrator is connected through the junction e, lead 105, junction 106, conductor 108, diode 63 and junction f to a condenser 64 belonging to one side of the seventh section VII, while the opposite side of the latter is connected with the conductor 104. The junction f is connected through a resistor 65, a junction h to the base electrode of a transistor 71 which is a member of a further Schmitt circuit to be described. The Schmitt circuit comprises transistors 71 and 72 and resistors 66, 67, 68, 69 and 70. The junction h is connected through a switch Y to the conductor 104. The collector of the transistor 71 is connected through a junction i to a further junction g connected in turn to the base of a transistor 73. This transistor 73 constitutes a member of a comparator circuit, the emitter of said transistor being connected through a junction e to a resistor 74.

The junction e is connected through a switch Z and a junction j to a resistor 76, the opposite side of the latter being connected through conductor 104 to ground. The collector of transistor 73 is connected through junction k and resistor 75 to the conductor 104. The junction k is connected through diode 77 and resistor 78 to a condenser 79. The junction j is connected through diode 80 and resistor 90 to a parallel combination of a condenser 79 and a discharging resistor 90, the opposite side of these circuit elements being grounded through the conductor 102. One end of the condenser 79 is connected through a junction m, a resistor 82 to a stationary contact 89 which is an element of switch or relay contact 87. On the other hand, the same junction m is connected through a Zener diode 83 to the base of a transistor 84, the collector of which is connected through a parallel combination of relay coil 85 and alarm lamp 86 to the power source terminal 39. As shown the relay coil 85 has relay contact 87 for on-off control of the cooperation thereof with either of stationary contacts 88 and 89. Normally, the relay contact 87 is closed with the contact 88 as shown. Upon energization of relay coil 85, relay contact 87 is brought into contact with the opposite stationary contact 89.

Figure 2:
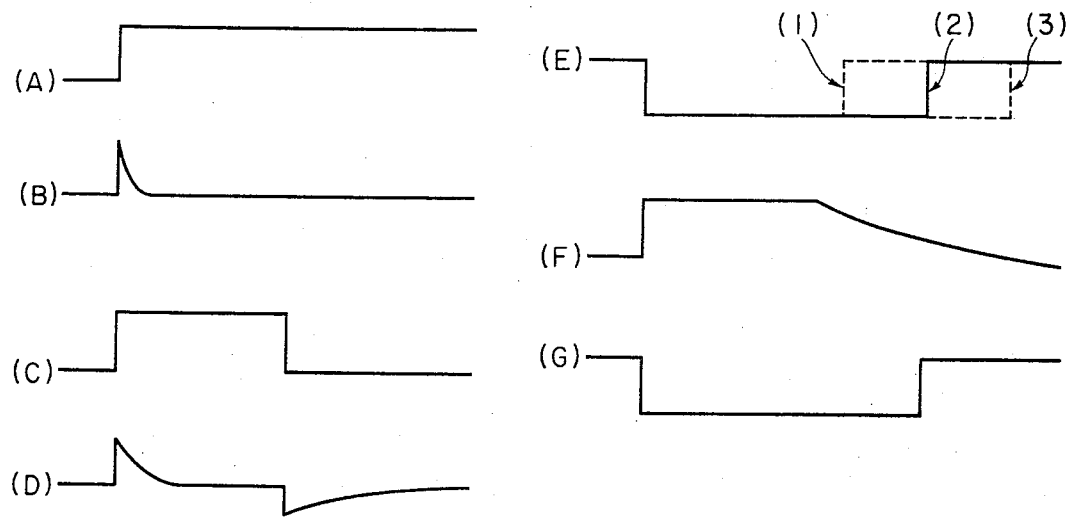
FIG. 2 are several voltage curves appearing at several preferred positions of the circuit shown in FIG. 1.

When a certain operation is performed upon the vehicle, for instance by manual closure of a self-starter motor on-off control switch or any other electrical or mechanical control means, the switch X which is operatively connected with such control switch or control means, although not specifically shown only for simplicity, is caused to close from its open position shown and an elongated rectangular voltage pulse as shown by way of example at (A) in FIG. 2 will appear at the junction a in FIG. 1, said pulse being conveyed to the trigger pulse circuit comprising condenser 43 and resistor 44 and subjected to a differentiation therein. Thus, a positive trigger pulse such as shown at (B) in FIG. 2 by way of example will appear at the junction b. This trigger pulse is then conveyed through diode 46 to the monostable multivibrator which is thus energized to deliver a constant width pulse. The pulse appearing at the collector side of transistor 54 is differentiated in the circuit for this purpose and the thus differentiated potential will have a smaller time constant for the rising edge of the pulse shown at (C) and appearing at the junction c and a larger time constant for the falling edge of the same pulse (C), being caused by the provision of the diode 58. In the similar way by the provision of the diode 62, an application of a suddenly rising positive potential as shown at the left hand end of the rectangular pulse at (C) in FIG. 2 to the junction c will result in a substantially large positive signal voltage applied to the base d of transistor 16 on account of a smaller value of the equivalent parallel resistance with the resistor 60. On the contrary, an application of a suddenly falling voltage such as at the right hand end of the pulse at (C) in FIG. 2 to the junction c and the thus resulted delivery of a negative trigger pulse from the differentiating circuit causes a relatively small voltage to be applied to the base terminal d of transistor 16, on account of a larger value, in this case, of the equivalent parallel resistance with the resistor 60.

It will be easily understood from the foregoing that a closure of said switch X will invite at first an instantaneous pseudo-deceleration signal voltage, and then, upon lapse of a certain predetermined time period, extinguishment of the generated pulse in the monostable multivibrator, a pseudo acceleration signal voltage will be delivered, as may be supposed from the corresponding pulses shown at (D) in FIG. 2, to the junction d in FIG. 1. By the closure of the switch X, the normally non-conductive transistor 54 of the monostable multivibrator will turn on, and a substantial voltage will be conveyed therefrom as an output through diode 63 to the condenser 64 wherein, therefore, a large voltage is instantly stored. When the charged voltage in this condenser 64 exceeds a predetermined value, the Schmitt circuit contained in the seventh section VII adapted for the determination of the time setting will reverse its operating mode. Thus, the transistor 54 of the monostable multivibrator will become conductive upon lapse of a certain predetermined time period after closure of the switch X. However, on account of a large voltage charge yet being stored in the condenser 64, the transistor 71 will continue its conducting state, as will be well judged from (G) in FIG. 2.

The charged voltage in the condenser 64 will initiate to discharge from the time point of conversion to its non-conductive mode, as seen from (F), FIG. 2. When the charged voltage lowers beyond a predetermined value, the transistor 71 will turn off. The conducting period of the transistor 71 extends from the closure of switch X to the termination of the present period which has been designed to be equal to the corresponding one to be found when the antiskid system works in the regular way.

When a pseudo skid signal artificially formed and delivered in the aforementioned way is applied, the main circuit sections will function as if they are delivered with a regular skid signal so that the electromagnetic coil 31 is energized for actuation of a pressure reducing device 99 to be described with reference to FIG. 3.

Figure 3:
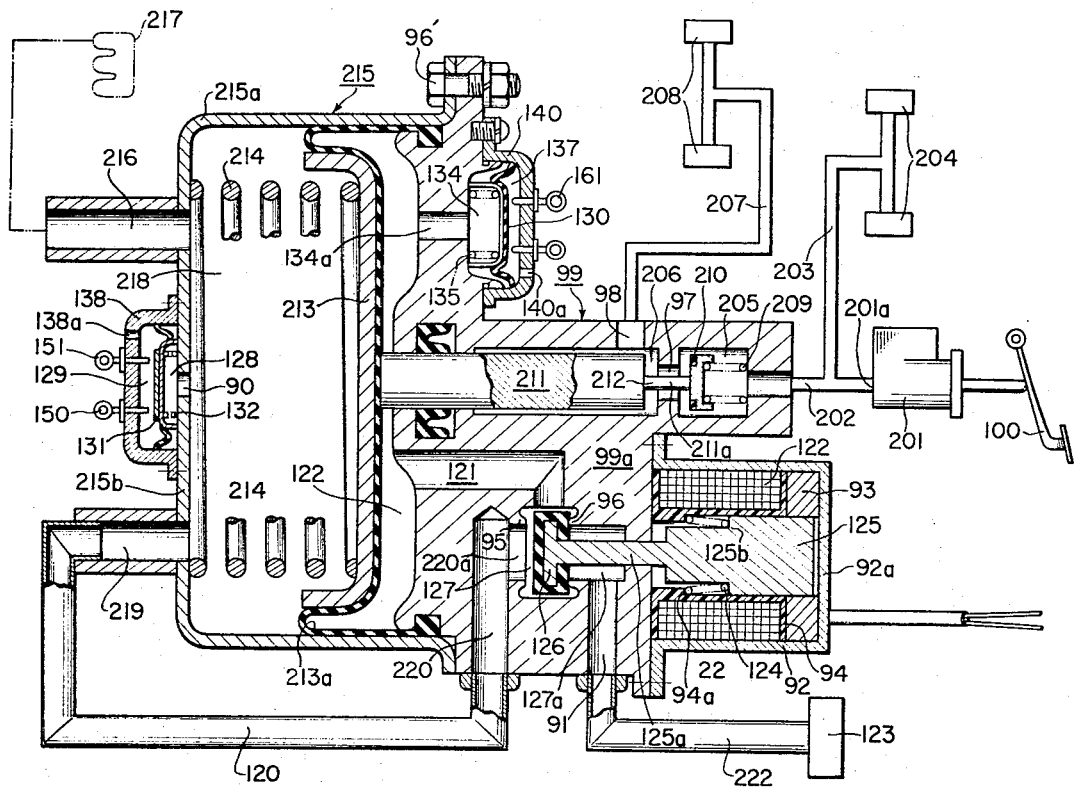
FIG. 3 is a substantially schematic and partially sectional view of a brake pressure reducing controller and electrical switch means attached thereto, said controller being operative upon application of a skid signal fed from the electronic circuit shown in FIG. 1.

In FIG. 3, the numeral 201 denotes a conventional master cylinder which is adapted for being controlled by a conventional brake pedal 200, preferably of the foot-operated type as shown and mechanically coupled with said master cylinder. Upon actuation of the pedal for the braking purpose, pressurized oil will be delivered from the outlet end 201a through pipings 202 and 203 to the conventional front wheel cylinders 204.

Conventional rear wheel cylinders 208 are kept in fluid communication through a piping 207 and a port 98 with a hydraulic chamber 206 which is also kept in turn in communication through an intermediate passage 97 with a further chamber 205, these chambers and the passage being formed within the body 99a of the pressure reducing device 99 already referred to.

Within the second or auxiliary hydraulic chamber 205, there is provided a cut-off valve 210 which movable axially and backed up by a return spring 209. This valve 210 is, however, so positioned by physical contact with a reduced extension 211a of a plunger that said passage 97 is kept open, said extension projecting through said passage 97 partially into the auxiliary chamber 205.

The plunger 211 projects from the main hydraulic chamber 205 leftwards through the main body 99a into a chamber 122 and abuts at its left-hand end against a diaphragm piston 213. A hollow housing 215 is fixedly attached said main body 99a by means of a plurality of fixing bolts 96 of which only one is shown in the drawing for convenience. The piston 213 is fitted with a flexible diaphragm proper 213a the outer periphery of which is thickened considerably and held firmly by being squeezed between the main body 99a and the housing 215a of servo means 215. By the provision of such diaphragm piston assembly 213–213a within the interior space of the housing 215a, two separate chambers 218 and 122 of variable volumes are formed as shown, of which the latter chamber 122 was referred to hereinbefore. A back-up spring 214 is provided between the outer wall part 215b of housing 215a and the diaphragm piston 213 so that the plunger 211 and its extension 211a are resiliently urged to move rightwards in FIG. 3, thus the cut-off valve 210 is positioned in its valve opening position as shown, against the back-up spring 209.

The chamber 218 is kept in fluid communication through a port 216 with a conventional vacuum source 217 which is preferably a suction manifold of a drive engine, not shown, of the automotive vehicle. Thus, this chamber 218 is normally kept in vacuum and in communication through a port 219, piping 120, port 220, duct 220a, valve chamber 127 and a duct 121 with the second chamber 122. Within the valve chamber 127, there is provided a valve member 126 which is adapted for cooperation with either of oppositely arranged valve seats 95 and 96, said valve 126 being carried by a movable plunger 125 by its reduced extension 125a made integral therewith. The valve is normally kept in cooperating position with the right-hand seat 96 so that vacuum will normally prevail within the second chamber 122.

Coil 31 referred to briefly hereinbefore is wound up around a hollow bobbin 94 which is fixedly mounted within the interior of a cup-shaped casing 92, the latter being fixedly attached by fixing screws, not specifically shown, to the right-hand end of the main body 99a of the pressure reducing device 99. Between the outer end wall 92a of the casing 92 and the right-hand end of the bobbin 94, there is fixedly mounted within the interior space of the casing a ring-shaped core piece 93 for magnetically cooperating therewith and for electromagnetically actuating said plunger 125. Between an inside shoulder 94a formed on the bobbin 94 and a step 125b on the plunger 125, there is inserted a coiled return coil 124 under tension, thus the plunger being urged to occupy its right-hand extreme position shown, for keeping the right-hand side valve seat 96 in a tightly closed position. The normally and sealingly closed valve chamber element 127a is fluidically connected through a port 91, a piping 222 and a cleaner 123 only schematically shown by a rectangular block, with the open atmosphere so that said chamber element is filled with air at atmospheric pressure.

On the outer surface of the end wall 215b of housing 215a, a small and hollow casing 138 is fixedly attached by means of a plurality of fixing bolts, although not specifically shown, and a diaphragm contact 131 is movably mounted with-in the interior of said casing 138 and backed up with a coil spring 132. By the provision of this diaphragm contact 131, the interior space of the housing 138 is divided into two chambers 128 and 129. The chamber 128 is kept in fluid communication through an opening 90 perforated through the wall 215b with the first servo chamber 218. Thus, the chamber 128 is normally kept at a vacuum while chamber 129 is kept in fluid communication with ambient atmospheric air through an opening 138a perforated through the casing 138. Stationary contacts 150 and 151 project from outside through the casing 138 into the atmospheric pressure chamber 129. On account of a pressure differential established across the diaphragm contact 131, the latter is urged towards right against the action of back-up spring 132 and the movable contact 131 is normally separated from contact with stationary contacts 150 and 151. A similar vacuum-operated switch unit 140 is mounted on the upper and outer surface of the main body 99a in FIG. 3. In this switch unit, numerals 130; 134; 135; 137; 160 and 161 correspond to 131; 128; 132; 129; 150 and 151, respectively. The communication opening 140a corresponds to that shown at 138a. The inner chamber 134 permanently communicates through a passage 134a, formed through the main body 99a, with the interior space of the second servo chamber 122 which is kept normally at vacuum as was referred to hereinbefore. The movable contact 130 is normally separated from stationally contacts 160 and 161 as before.

When the driver depresses the brake pedal 200 by applying a sudden and substantial foot pressure so that a wheel lock may be invited. A considerably increased hydraulic pressure is delivered from its outlet 201a and an electric signal is transmitted as conventionally in this kind of antiskid brake control system to electromagnetic coil 31, which is shown also in FIG. 1, for energization thereof. With the energization of coil 31, plunger 125 is attracted towards left in FIG. 3 against the action of the return spring 124. In this way, the valve 126 is transferred from contact with the right-hand valve seat 96 to the newly contacting position with the left-hand valve seat 95, thereby the hitherto established fluid communication between the piping 120 and the duct 121 being interrupted and a new fluid communication between the piping 222 and the duct 121 being created and maintained. In this way, ambient atmospheric air will invade through the cleaner 123; piping 222; port 91, chamber element 127a now communicating through the open valve seat 96 with the duct 121, with the interior space of the second servo chamber 122 from which the hitherto maintained vacuum is purged. The atmospheric pressure now prevailing within the chamber 122 acts upon the diaphragm piston 213 which is thus urged to move leftwards in FIG. 3 against the action of the return spring 214. On account of the hydraulic pressure prevailing within the chamber 206, the plunger is moved hydraulically leftwards and follows up after the shifted diaphragm piston 213. Under the influence of the action of the back-up spring 209, the valve member 210 will be brought into its left-hand extreme position for closing the intermediate passage 97 to interrupt the hitherto maintained fluid communication between the chambers 205 and 206. Under these operating conditions, the boosted-up hydraulic output pressure from the master cylinder is interrupted from being transmitted to the rear wheel cylinders 208. Under the influence of the hydraulic pressure prevailing within the chamber 206, the plunger 211 will continue to follow after the leftward shifting of the diaphragm piston 213, thereby the effective volume of the chamber 206 being increased relative to its regular value, inviting in effect a corresponding reduction in the hydraulic pressure prevailing in the brake piping 207 leading to the rear wheel cylinders 208 for removing a possible wheel lock thereat.

By loosening the brake application in the aforementioned way, the fear of wheel lock is positively avoided and the skid-warning signal will disappear in the conventional way, so as to de-energize the electromagnetic coil 31. Upon de-energization of this coil, the urging force electromagnetically applied to the plunger 125 is removed and the latter will be returned to the shown normal position under the influence of its return spring 124. Thus, the change-off valve 126 will be again brought into its cooperating position with the right-hand seat 96. Thus, the second servo chamber 122 is returned to a vacuum and the diaphragm piston and plunger are returned to their initial positions as shown. The effective volume of the main hydraulic chamber 206 is also reduced to its normal value and the brake pressure is again applied to the rear wheel cylinders 208. By returning the cut-off valve 210 to its open position as shown, the hydraulic live pressure is again supplied from the outlet end of the master cylinder 201 to the rear wheel cylinders.

It should be noted that when atmospheric pressure air prevails within the second servo chamber 122, it invades naturally into the switch chamber 134 and the movable contact 130 will be urged to move rightwards in FIG. 3 under the action of return spring 135 and brought into contact with stationary contacts 160 and 161, thus the latter are connected electrically with each other.

On the other hand, the switch unit 138 is so designed and arranged that its movable contact 131 is moved to the left to separate it from the stationary contacts 150 and 151 to keep them in separation from each other, when enough vacuum pressure is maintained within the first servo chamber 218 for allowing the pressure reducing device 99 to actuate. Thus, it can well be understood that with ample and regular vacuum pressure prevails within the first chamber 218, the contacts 150 and 151 are being kept open. These stationary contacts are therefore normally opened.

When the pressure reducing devide 99 is actuated in the aforementioned way, the switch Z shown in FIG. 1 is brought into closure, thus the emitter potential of transistor 73 becomes lower.

When the vacuum for the pressure reducing device 99 is not available or lower than a predetermined value, such as when the vehicle drive engine is not rotating, or is at its initial lower running state directly after starting, an application of a pseudo skid signal does not close switch Z and the safety circuit would provide a false warning signal as if there be an operational failure of the antiskid braking system. In the embodiment shown, there is provided a vacuum-operated switch Y at the input side of the aforementioned Schmitt circuit shown in FIG. 1 and the whole arrangement is designed so that the safety circuit can operate when the switch Y is kept open, for the purpose of avoiding the aforementioned occasional drawback. In the shown embodiment, more specifically, the closure of the switch Y will short-circuit the input end of the Schmitt circuit for nulifying the preset time period, thus the safety circuit is disabled. When the operation period of the pressure reducing device is extended from other causes due to a defective functioning of the pressure reducing device 99, the safety circuit could operate in the regular way.

In the following, the operation of the safety circuit will be described in detail in the case of the regular functioning of the antiskide brake system.

Since the preset time period for the circuit section VII is set to be equal to the closure period of the switch Z, the transistor 73 can not be brought into conduction. On the other hand, the voltage charge stored in the condenser 79 through diode 80 and resistor 81 upon closure of the switch Z does not become larger than the prescribed value by the Zener diode 83, the transistor 84 does not turn on. The voltage potential appearing at the junction $e$ in the case of a proper operation of the device 99 will take the form shown at (2) of FIG. 2 (E).

It is now assumed that the antiskid brake system should fail to operate properly and the closure period of switch Z is shorter than the preset time period for the circuit section VII.

Upon opening of the switch Z, the emitter potential of the transistor 73 will become instantly higher so that it is brought into conduction and voltage will be conveyed through diode 77 and resistor 78 to condenser 79 and stored therein. With the thus stored voltage exceeds a predetermined value, the transistor 84 will turn on, thereby alarm lamp 86 being ignited and at the same time relay 85 being energized. With energization of relay 85, contacts 87 and 88 are opened with each other and contacts 87 and 89 are closed together. With de-energization of coil 31 and with the simultaneous connection of resistor 82 with source terminal 39, relay 85 will continue its self-holding state. This operational mode corresponds to the curve at (1) of FIG. 3, (E). Thus, the driver is given an alarm and at the same time, the antiskid system is made non-operative. As the warning means, there is provide a visual alarm, such as, in the form of warning lamp 86 which can be, however, replaced by any other conventional alarming means, such as, for instance, an audio alarm, a vibrating warning means or the like.

In the following, consider such a case that a pseudo skid signal is applied while the antiskid system is being disable, or an application of a skid signal from the antiskid system will invite an unusually extended operational period of the pressure reducing device 99, or an extraordinarily elongated closure period of switch Z. By closure of the latter, the voltage stored in the condenser 79 elevated gradually through resistor 74, diode 80 and resistor 81 and when the charging period should exceed beyond the aforementioned predetermined value, the transistor 84 will become conductive. This condition corresponds the curve at (3) of FIG. 3, (E).

Then, the further operations will be performed as before and at last, the warning lamp 86 is ignited and at the same time, the antiskid system is made disable as before.

Figure 4:
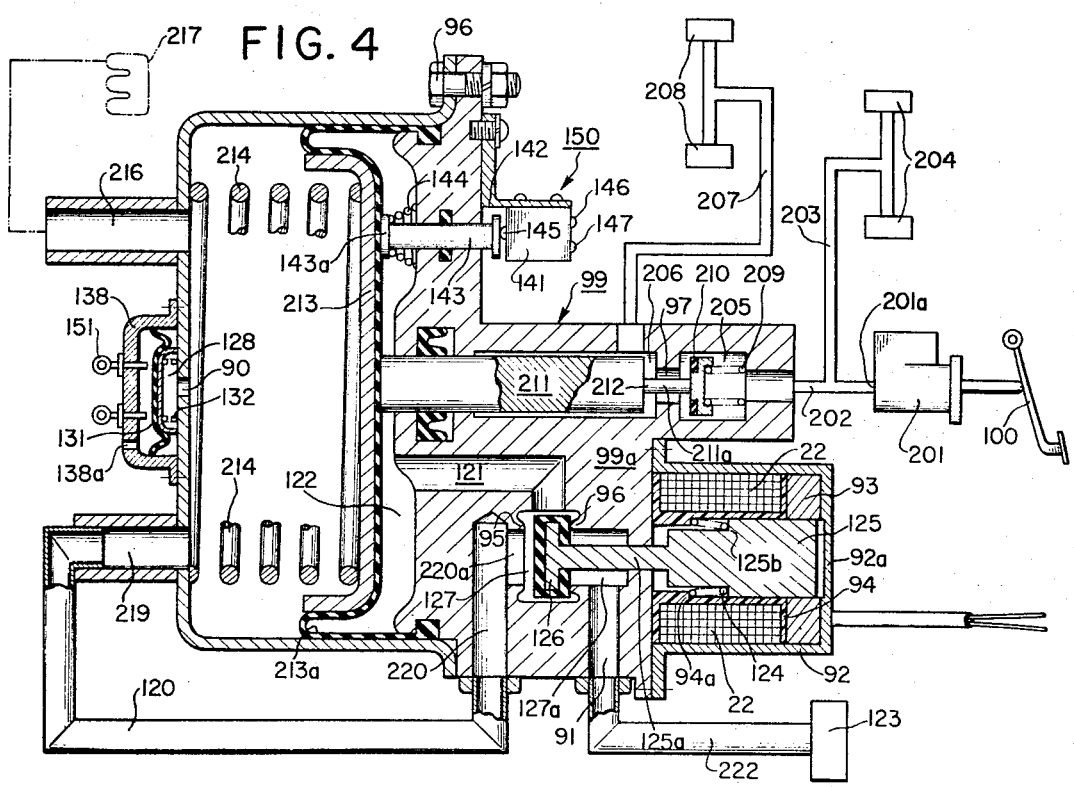
FIG. 4 is a similar view to FIG. 3, illustrative of a slightly modified arrangement from that shown in FIG. 3, wherein same or similar parts as before are denoted with respective same reference numerals.

The arrangement shown in FIG. 4 is a modification from that shown in FIG. 3. In this modification, the foregoing switch unit 140 has been replaced by a displacement switch 150. In a bored opening similar to that shown at 134$a$ in FIG. 3, a small plunger 143 is slidably mounted and the inner end of the plunger is headed and kept in pressure contact with the diaphragm piston 213 under the influence of a spiral spring 144 inserted under pressure between the plunger head at 143a and the inside surface of main body 99a, while the opposite end of the same plunger is kept in pressure engagement of the switch arm at 145. This switch arm can be therefore moved in synchronism with movement of said plunger.

The switch 50 has a pair of terminals 146 and 147 which are normally kept open. A support 142 in the form of an angle is fixedly attached to the main body 99a and fixedly carries the switch 150.

Now assuming that atmospheric air invades into the second servo chamber 122, diaphragm piston 213 will be moved leftwards and the plunger 143 will be moved in synchronism therewith. The hitherto applied mechanical pressure will be relieved from application upon switch arm 145 and therefore the terminals or contacts 146 and 147 are caused to close with each other. Further operations are same as before.

It should be mentioned that the switch 140 or 150 may be replaced for the switch Z shown in FIG. 1, and that shown at 138 may serve well as the switch Y in FIG. 1.

Should a coil or lead be broken or short-circuited, of or around the signal generator 10, the safety circuit according to this invention may well detect it. In such case where the coil is short-circuited, the base potential of transistor 16 will become substantially higher than otherwise and the pressure reducing period will be substantially prolonged, resulting in a corresponding prolongation of closure period of switch Z. If a lead should be broken, the base potential of the same transistor will become lower and the pressure reducing period will be shortened. Therefore, the safety circuit will be brought into operation and thus, the fault in the antiskid system can be easily detected.

The switch such as at Z which is operatively connected a certain electrical control or other member on the vehicle may be replaced by a manually operable independent switch.

When necessary, the pseudo-skid signal may be selected larger than the voltage which is delivered from the skid-sensing and skid signal generating means during the non-skid period. As a still counter measure, the output voltage from the signal generating means may be made smaller each time it delivers of a skid signal. In this way, a fault may be detected at every time other than the time when the vehicle is stationary.

If the pressure reducing device is to be sensed as its operativeness or defectiveness, the corresponding means may be so modified so as to sense the energizing voltage of the electromagnetic coil 31. For this purpose, the switch Z may be removed and the collector side of transistor 30 is electrically connected with the collector side of transistor 73.

The wheel deceleration or acceleration signal generator may be a generator of any kind which is adapted for delivery of a voltage responsive to the acceleration of the wheel, as was referred to. However, this kind of embodiment is not limitative for the invention. Any person skilled in the art may easily find any other convenient conventional means adapted for serving the desired purpose.

Figure 6:
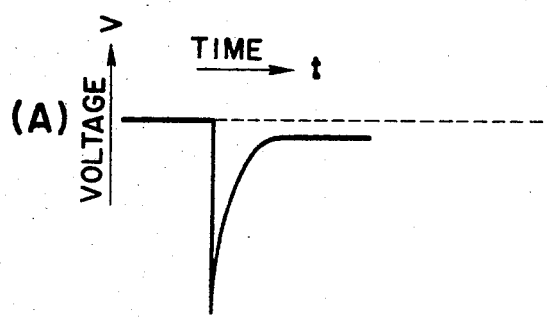
FIG. 6 is a characteristic curve of the device according to this invention shown only by way of example.
Figure 6:
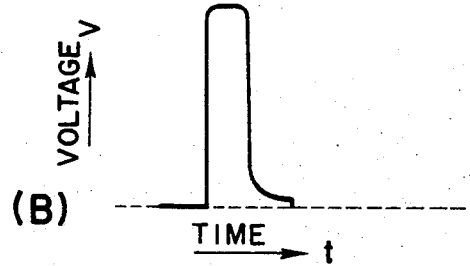
Figure 7:
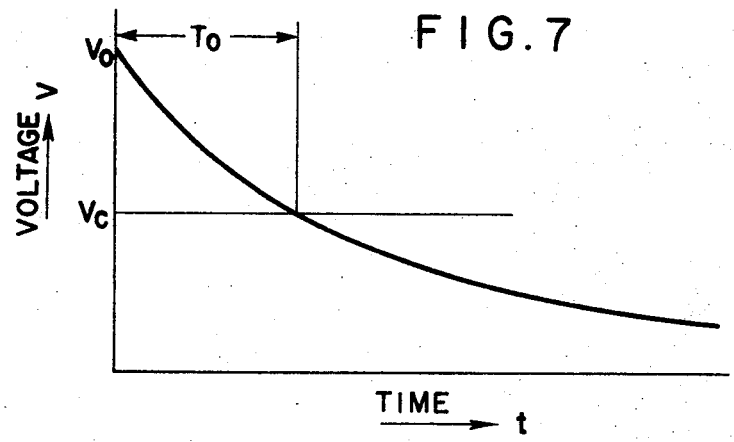
FIG. 7 is illustrative of several preferred voltage curves appearing at several points in the circuit shown in FIG. 5.

Next, referring to FIGS. 5-7, a second preferred embodiment of the invention will be described.

Figure 5:
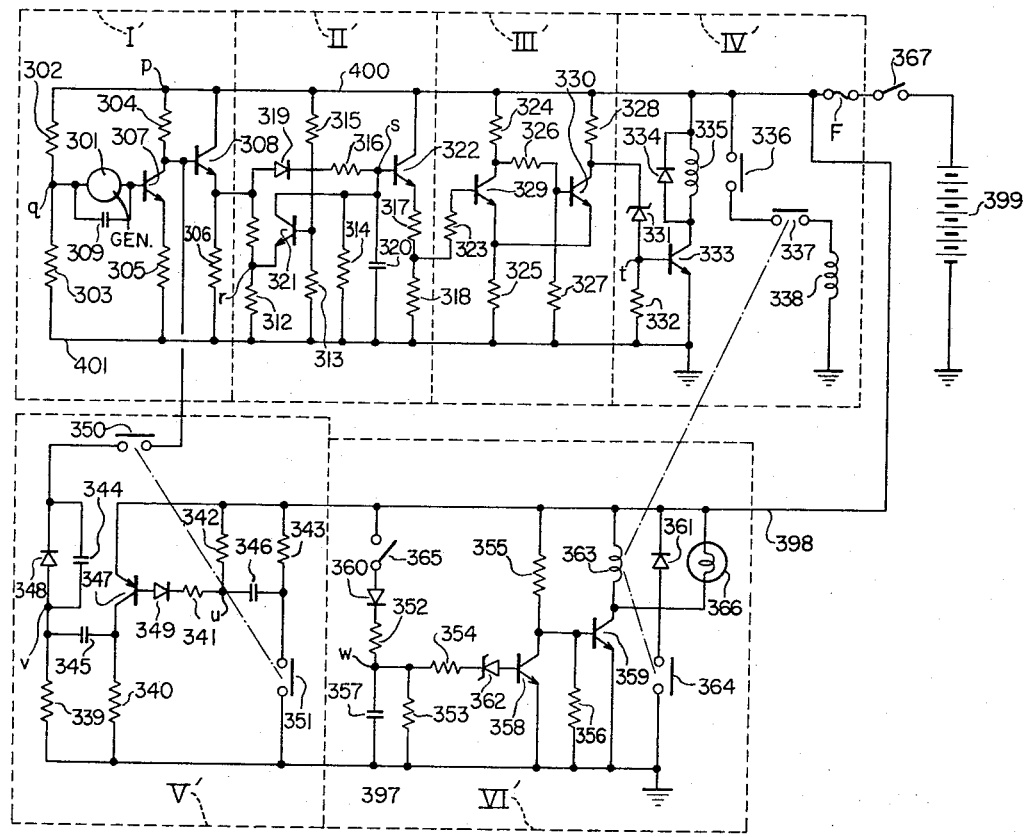
FIG. 5 is a circuit diagram similar to that shown in FIG. 3, illustrative of a preferred second embodiment thereof.

In FIG. 5, the numeral 301 denotes a sensing means adapted for detecting the wheel deceleration degree appearing upon a brake application and the wheel accelearion degree appearing upon release of an applied brake, said means 301 being same with or similar to that shown at 10 in FIG. 1 and adapted for delivering an output voltage responsive to the sensed value. The output of the sensing means 301 is connected to an amplifier, as before, which comprises several resistors 302, 303, 305 and 306 and two transistors 307 and 308. In the circuit part comprising the base and collector electrodes of transistor 307, said deceleration and acceleration sensing and signal issuing means 301 and the series combination of resistors 302 and 304 are inserted as shown. The collector of transistor 308 is connected to the junction p situated between said resistors 302 and 304, said junction being inserted in a conductor 400 which leads to the positive side of a d.c. voltage source 399. Junction q situated between the signal generator 301 and the resistor 302 is connected through the resistor 303 to a further conductor 401 which leads to ground. The emitter of transistor 307 is connected through resistor 305 to the same conductor 401 to which the emitter of transistor 308 is connected through resistor 306, the collector of transistor 307 being connected to the base of transistor 308. A condenser 309 is connected across the generator 301. The said circuit elements are included in the first sub-circuit or section I' which is similar to that denoted I in FIG. 1.

The output voltage signal from the generator 301 is delivered in the section I' and conveyed therefrom to the next following condenser section II'.

This condenser section II' includes several resistors 311-318, diode 319, condenser 320 and two transistors 321 and 322.

The series combination of diode 319, resistor 316 and condenser 320 is connected in parallel with the resistor 306 which is inserted between the emitter of transistor 308 and the ground conductor 401. The series combination of resistor 311 and 312 is connected in parallel with said resistor 306, and the emitter of a transistor 321 is connected to a junction r which is situated between resistors 311 and 312. The base of transistor 321 is connected through resistor 315 and a part of conductor 400 to the collector of transistor 308, the same base of transistor 321 being connected through resistor 313 to ground conductor 401. Collector of transistor 321 is connected with said junction r. Resistor 314 is connected in parallel with condenser 320.

Condenser 320 is connected with a junction s which is connected in turn with the base of transistor 322, on the one hand, and with resistor 316, on the other hand. The series connection of resistors 317 and 318 is connected with the emitter of transistor 322, the collector of the latter being connected to the collector of transistor 308 via conductor 400.

It will be easily understood that the condenser 320 is charged through diode 319 with an output signal delivered from the sensor section I' and in response to the wheel deceleration degree when the wheel is subjected to braking or deceleration and the condenser charge will be discharged through transistor 321 during a wheel acceleration or wheel brake release period. The voltage across the condenser 320 will be applied as an electrical signal to the base of transistor 322. A corresponding signal output is then taken out from the transistor 322 through its emitter and conveyed to the next following setting section III' through resistors 317 and 323.

The setting section III' comprises resistors 324–328 and two transistors 329 and 330 constituting in combination a Schmitt circuit and being adapted for taking out from the foregoing section II' only an excessing signal over a predetermined value which is determined by the overall circuit constant and conveying it to the next succeeding circuit section IV' and in the form of a pressure-reducing signal, said section IV' acting in its entirety as a release circuit.

This release circuit section IV' comprises Zener diode 331; resistor 332; transistor 333; diode 334; relay coil 335; a relay switch 336 controllable thereby; a further relay switch 337 controllable by a certain relay coil to be described; and a release coil 338 controlling an electromagnetic valve, not shown, which is inserted as in a hydraulic pressure control system.

Series connection of Zener diode 331 and resistor 332 is connected at its one end with the collector of transistor 330 contained in the foregoing section III', while the opposite end of said series connection is connected with the earth conductor 401. Junction $t$ situated between Zener diode 331 and resistor 332 is connected to the base of transistor 333, the collector of which is connected through a parallel combination of diode 334 and relay coil 335 to the positive conductor 400, while the emitter of said transistor 333 being connected with the ground conductor 401. One end of a series combination of relay switches 336 and 337 and release coil 338 is connected to the positive conductor 400, while the opposite end of said series combination is grounded. The relay coil 338 is adapted for energization, so as to release a brake application when necessary.

When an instruction signal for pressure reduction is delivered from the setting circuit section III' to the transistor 333, the latter turns on and current will flow through relay coil 335, thereby its relay switch 336 being closed. If, at this stage, the switch 337 is closed, release coil 338 is energized and the wheel cylinder pressure is reduced for loosening applied brake pressure.

In the following, an overall operation of the present invention will be described in detail.

When a brake pressure is applied to the related vehicle wheel, as before, by depressing the brake pedal such as at 100 in FIG. 3, a wheel deceleration signal develops in the detection circuit section I' and the condenser 320 is charged in response to the detected wheel deceleration degree, as was briefly referred to.

When the brake application is of sudden and substantial nature so that the charged voltage exceeds a predetermined value, the setting circuit section III' is brought thereby into actuation for delivering a pressure reducing instruction signal which is conveyed to the next following or release circuit section IV' for energization of coil 338 so as to release the brake application. There is, however, a certain time lag for providing the effect upon the wheel in the brake release sense, because of the necessary motion transmission period for actuation of the related mechanical and hydraulic brake system after the electric energization of release coil 338. It may be seen, therefore, that, in practice, even when the charged voltage in the condenser 320 attains a predetermined or preset value, the brake application will continue, and that a maximum possible charged voltage or wheel deceleration degree will appear after attainment of the predetermined value and decrease gradually thereafter.

Upon the release of the brake application, the wheel will be subjected again to an acceleration on account of the presence of vehicle inertia and an wheel acceleration signal responsive to the practically and occasionally invited wheel acceleration will be generated in the detection circuit section I'. When this wheel acceleration signal attains a predetermined value, transistor 321 turns on and condenser 320 discharges rapidly. The amount of this discharge through the transistor 321 will become larger, the larger the wheel acceleration degree, the slope of the discharge curve being naturally more acute.

With progress of said discharge, the voltage across the condenser 320 will rapidly be reduced and when this voltage attains a preset value, the instruction signal being delivered from the section III' will terminate and the actuation of the release circuit section IV' will be ceased. Then, release coil 338 is de-energized and the wheel will be subjected again to brake application which invites again the generation of a wheel deceleration signal in the section I', and so on, until the vehicle will be brought to dead stop.

In the present embodiment, a pseudo-signal generator and a safety circuit proper are added to the assembly of the foregoing several sections I'–IV'.

Section V' comprises the aforementioned pseudo-signal generator which is so designed and arranged to provide such pseudo-signal to the detector section I' and includes resistors 344–346; transistor 347; diodes 348–349; and switches 350 and 351. To the d.c. voltage source 399, a series combination of resistor 343 and switch 351 are connected through positive conductor 398 and ground conductor 397, while a series combination of resistor 342 and condenser 346 are connected parallel with resistor 343. Junction $u$ between resistor 342 and condenser 346 is connected through resistor 341 and diode 349 to the base of transistor 347, the emitter of which is connected with positive conductor 398, while the collector of the same transistor is connected with ground conductor 397.

The series combination of condenser 345 and resistor 339 is connected across resistor 340. Junction $v$ between condenser 345 and resistor 339 is connected through a parallel connection of diode 348 and condenser 344; and switch 50, to the base electrode of transistor 308 of the detector section I'.

Switches 350 and 351 are arranged in a gang switch which can be so arranged, by way of example, to link with the door key operation or the like, although not specifically shown.

In the pseudo signal generating section V', a closure of switch 351 will generate and deliver an electrical signal which is then subjected to a regularizing wave shaping operation and the thus neatly reshaped signal is delivered as the pseudo signal for the desired purpose to the detector circuit section I'.

The section VI' comprises a safety circuit proper adapted for sensing if the pressure reducing period relative to the hydraulic control system has attained a predetermined value or not, in response to the proper functioning of the several foregoing circuit sections I', II', III' and IV' and for interrupting the delivered pressure reduction instruction signal fed to said hydraulic control system. The safety circuit also operates any convenient warning means such as a warning lamp.

The section VI' comprises resistors 352–356; condenser 357; two transistors 358 and 359; diodes 360 and 361; Zener diode 362; relay coil 363; relay switch 364 controlled thereby; switch 365 and warning lamp 366. In this section, a series connection of switch 365; diode 360; resistor 352 and condenser 357 is connected between the conductors 397 and 398, a resistor 353 being connected across the condenser 357. Junction w positioned between resistor 352 and condenser 357 is connected through resistor 354 and Zener diode 362 to the base of transistor 358, while the collector of the latter is connected through resistor 355 to positive conductor 398 while its emitter is grounded.

Collector of transistor 358 is grounded through resistor 356 and connected with the base of transistor 359. Collector of this transistor 359 is connected through relay coil 363 to positive conductor 398, and emitter of the same transistor is earthed.

Collector of transistor 359 is grounded through relay switch 364, and diode 361 and warning lamp 366 are connected, respectively, across the relay coil 363.

In the present embodiment, switch 365 is provided in the hydraulic pressure control system for the braking arrangement and so designed and arranged that when a pressure reduction instruction signal is fed, the release coil being actuated thereby and the electromagnet valve such as 126 in FIG. 1 is energized as before, it displaces and opens its contacts hydraulically, pneumatically or the like. So far as the hydraulic pressure control system is maintained under pressure, the contacts of the last-mentioned switch are kept always open.

Relay coil 363 is adapted for actuation of relay switch 337 of section IV' and that denoted 364 in section VI'.

With closure of switch 365 during the pressurized holding period of the hydraulic pressure control system, relay coil 363 can not be energized, relay switch 337 of release circuit section IV' remains closed, relay switch 364 is in its open position.

With the switch 365 opened transistor 359 will turn on, upon lapse of a predetermined standard time period, thereby relay coil 363 becoming energized and relay switch 337 being opened. Thus, the operation of release coil 338 is ceased and relay switch 364 is closed for igniting alarm lamp 336. Pseudo signal generating section V' and the safety circuit proper will act in the following way:

When the driver actuates a certain controllable or actuatable means such as a key-operated automotive door, switch 351 is closed, although the cooperating means has been omitted from the drawing only for simplicity.

An electrical signal as shown by way of example at (1) in FIG. 2 is generated in the differentiating circuit comprising resistor 342 and condenser 346 and delivered through diode 348 and condenser 344 to the base of transistor 308 in the detector section I'.

In response to this pseudo-signal, the successive circuit sections I', II', III' and IV' are brought into actuation as in the aforementioned way, thus the release coil 338 is actuated.

In this way, a pseudo-signal serving for the desired safety purpose may be generated and delivered at all times when necessary, but excluding an emergency period, for actuating the hydraulic pressure control system.

In the safety circuit proper contained in section VI', on the other hand, release coil 338 for the hydraulic pressure control system has not yet been brought into actuation; switch 365 is always kept in its closed position during the whole pressurized holding period of said control system and condenser 357 is charged to a certain predetermined potential level which may be denoted as $V_o$, so that current will flow through resistor 354 and Zener diode 362 to the base of transistor 358 which turns thereby on. On the other hand, transistor 359 is kept in its non-conductive position, and no current will flow through relay coil 363 and warning lamp 366.

By delivery of a pressure reducing instruction signal from the setting section III', release coil 338 is energized and the electromagnetic valve is brought into actuation, thereby the switch 365 is caused to open and the condenser charge at 357 is discharged. This discharge from the condenser 357 is carried into effect, depending upon the time constant which is determined by the circuit data comprising those of resistors 353 and 354, Zener diode 362, and the regular passage resistance between emitter and base of transistor 358. In this way, the potential in the condenser will vary, as shown by way of example in FIG. 6.

When the duration period of the pressure reducing signal appearing in the setting circuit section III' is shorter than the preset standard value which may be denoted $T_o$, the energization of release coil 338 will cease with extinction of said pressure reducing signal, and the hydraulic pressure control system is pressurized, whereupon the switch 365 is closed and the condenser 357 will initiate a recharging.

When, however, the duration period of the pressure reducing signal is longer than said value $T_o$, the condenser potential will become, upon lapse of said time period $T_o$, less than a certain value $V_c$ which is equal to a sum of Zener voltage at Zener diode 362 with the voltage $V_{BE}$ at the transistor 358, and at the same time, transistor 358 will become non-conductive, while transistor 359 will turn on.

In this way, it can be adjudged that the duration period of the pressure reducing signal or that of release of energization of the release coil for the hydraulic pressure control system has attained at the aforementioned preset standard time period $T_o$.

With conduction of transistor 359, current will pass through relay coil 363 for the energization thereof to cause brake application. At the same time, warning lamp 366 is ignited; relay switch 364 is closed and maintained in this closed position.

Return operation of the once actuated safety circuit will be brought about, thus, by opening the main switch and then, reclosing the latter.

In this way, should the pressure reducing period of the hydraulic pressure control system become longer than the preset period $T_o$, the pressure reducing signal will be interrupted instantly, and the pressure reducing operation will be brought to stop.

The aforementioned, preset time period $T_o$ is determined relative to a road surface which provides a certain least frictional coefficient value. In addition, the pressure reducing period in which switch 365 is kept open by application of a pseudo-signal from the pseudo-signal generating circuit section V' is slightly shorter than the aforementioned preset value $T_o$.

When all the circuit sections operate in the regular manner, the pressure reducing signal fed from the setting circuit section III' becomes in its duration period shorter than the preset value $T_o$ so that the safety circuit proper is not brought into operation.

The embodiment of the invention in which an exclusive property or privilege is claimed are as follows:

1. An antiskid hydraulic brake pressure control system including an electronic safety device, said safety device comprising:
    a. pseudo skid signal generator means for generating a pseudo signal similar to a normal skid signal, said pseudo skid signal generator including:
        1. pulse generator means for generating a trigger pulse upon the actuation of a first switch;
        2. monostable multivibrator means, fired by said pulse generator means, and
        3. differentiating means coupled to said monostable multivibrator means for producing said pseudo skid signal which is similar to a normal skid signal wherein said differentiating means is coupled to the output of said wheel deceleration sensing means;
    b. wheel sensing means for sensing the deceleration of a wheel upon application of a brake associated with the wheel and the wheel acceleration upon the release of the brake, and for generating a normal skid signal;
    c. wheel skid circuit means for receiving the output of said wheel deceleration sensing means and for generating a signal to control the operation of said control system;
    d. means for applying said pseudo signal to the input of said wheel skid circuit means; and
    e. testing means for determining if said control system and said wheel skid circuit means respond properly to said pseudo skid signal.

2. The apparatus of claim 1 wherein said pseudo skid signal represents vehicle deceleration for a predetermined period of time and then represents vehicle acceleration.

3. The apparatus as set forth in claim 1 wherein:
    a. said wheel sensing means includes a signal generator means for generating a deceleration signal during brake application and for generating an acceleration signal during the non-application of the brakes, and amplifying means for amplifying said deceleration and acceleration signals; and
    b. said wheel skid circuit means comprises:
        1. pressure reducing circuit comprising a transistor and a capacitor wherein said capacitor is charged in response to the deceleration signal of said signal generator means, said capacitor having a slow discharge path and said transistor is switched between the conductive and non-conductive state in response to the acceleration signal of said signal generator means wherein said transistor provides a fast discharge path for said capacitor when in its conductive state; trigger means for producing an output in response to the charging of said capacitor; and
        2. relay means, for releasing the brake pressure, said relay means being energized by the output of said trigger means.

4. The apparatus as set forth in claim 3 further including circuit means responsive to said wheel acceleration signal for switching said third transistor between its conducting and non-conducting state and thereby controlling the fast discharge of said third capacitor.

5. An anti-skid hydraulic brake pressure control system including an electronic safety device, said safety device comprising:
    a. pseudo skid signal generator means for generating a pseudo signal similar to a normal skid signal;
    b. wheel sensing means for sensing the deceleration of a wheel upon application of a brake associated with the wheel and the wheel acceleration upon the release of the brake, and for generating a normal skid signal;
    c. wheel skid circuit means for receiving the output of said wheel deceleration sensing means and for generating a signal to control the operation of said control system;
    d. means for applying said pseudo signal to the input of said wheel skid circuit means; and
    e. testing means for determining if said control system and said wheel skid circuit means respond properly to said pseudo skid signal said testing means including:
        1. measuring means for measuring the response time of said control system to said pseudo skid signal; and
        2. indicator means for producing a signal if said system does not respond to said pseudo skid signal in a first predetermined period of time or if said system responds to said pseudo skid signal for less than a second predetermined period of time.

6. The apparatus as set forth in claim 5 wherein said measuring means includes:
    a. a pressure reducing period circuit comprising a first transistor and a first capacitor, said first capacitor charging in response to said pseudo signal, wherein said first transistor is switched between its conducting and non-conducting states in response to the charge on said first capacitor;
    b. a detecting circuit comprising a switch which is switched in response to the action of said system; and
    c. comparator means for comparing the conducting state of said first transistor and the state of said switch whereby the output of said comparator circuit produces an indication of the performance of said system.

7. The apparatus as set forth in claim 5 wherein said indicator means includes means for disabling said system if said system does not respond properly to said pseudo skid signal.

8. The apparatus as set forth in claim 6 wherein said measuring means further includes a second transistor and a second capacitor coupled to said comparator, said capacitor being charged in response to the output of said comparator means, wherein said second transistor becomes conductive when said second capacitor becomes charged.

* * * * *